US005532732A

United States Patent [19]
Yuen et al.

[11] Patent Number: 5,532,732
[45] Date of Patent: Jul. 2, 1996

[54] APPARATUS AND METHODS FOR USING COMPRESSED CODES FOR MONITORING TELEVISION PROGRAM VIEWING

[75] Inventors: Henry C. Yuen, Redondo Beach; Daniel S. Kwoh, La Canada, both of Calif.

[73] Assignee: Gemstar Development Corporation, Pasadena, Calif.

[21] Appl. No.: 122,146

[22] Filed: Sep. 16, 1993

Related U.S. Application Data

[63] Continuation-in-part of Ser. No. 934, Jan. 5, 1993, abandoned, which is a continuation-in-part of Ser. No. 965,075, Oct. 22, 1992, abandoned, which is a continuation of Ser. No. 877,687, May 1, 1992, abandoned, which is a continuation-in-part of Ser. No. 829,412, Feb. 3, 1992, Pat. No. 5,307,173, which is a continuation-in-part of Ser. No. 767,323, Sep. 30, 1991, abandoned, which is a continuation-in-part of Ser. No. 676,934, Mar. 27, 1991, Pat. No. 5,335,079, which is a continuation-in-part of Ser. No. 371,054, Jun. 26, 1989, abandoned, which is a continuation-in-part of Ser. No. 289,369, Dec. 23, 1988, abandoned.

[51] Int. Cl.⁶ ............................... H04N 7/00; H04N 7/10
[52] U.S. Cl. ..................... 348/1; 455/2; 358/335
[58] Field of Search ............................. 358/335, 310; 360/33.1; 348/731, 732, 734, 1–5; 455/179.1, 184.1, 185.1, 186.1, 186.2, 2; H04N 5/76, 5/765, 5/775, 5/44, 5/50, 5/92, 7/97, 7/00, 7/10

[56] References Cited

U.S. PATENT DOCUMENTS

| | | | |
|---|---|---|---|
| 4,025,851 | 5/1977 | Hasselwood et al. | 325/31 |
| 4,489,351 | 12/1984 | d'Alayer de Costemore d'Arc | 358/335 |
| 4,706,121 | 11/1987 | Young | 358/335 |
| 4,866,434 | 9/1989 | Keenan | 348/734 |
| 4,933,765 | 6/1990 | Schiff et al. | 348/476 |
| 4,963,994 | 10/1990 | Levine | 358/335 |
| 5,166,911 | 11/1992 | Misawa et al. | 358/335 |
| 5,187,589 | 2/1993 | Kono et al. | 358/335 |
| 5,307,173 | 4/1994 | Yuen et al. | 358/335 |

*Primary Examiner*—Thai Q. Tran
*Attorney, Agent, or Firm*—Christie, Parker & Hale

[57] ABSTRACT

An apparatus and method for television audience monitoring includes an apparatus and method for determining that a television is turned on. Compressed codes, each representative of, and compressed in length from, the combination of a channel and a time-of-day for a program are retrieved from a television signal received by the television. Each compressed code is decoded and expanded into a channel and time-of-day for a program. The channel and time-of-day for a program are stored when the apparatus for determining that a television set is turned on indicates that the television set is turned on. Alternately, the compressed codes are stored. The decoding and expanding of the compressed code into channel and time-of-day is performed as a function of the clock output. Upon command the stored channel and time-of-day for a program or the stored compressed code for a program are sent over a telephone line.

20 Claims, 7 Drawing Sheets

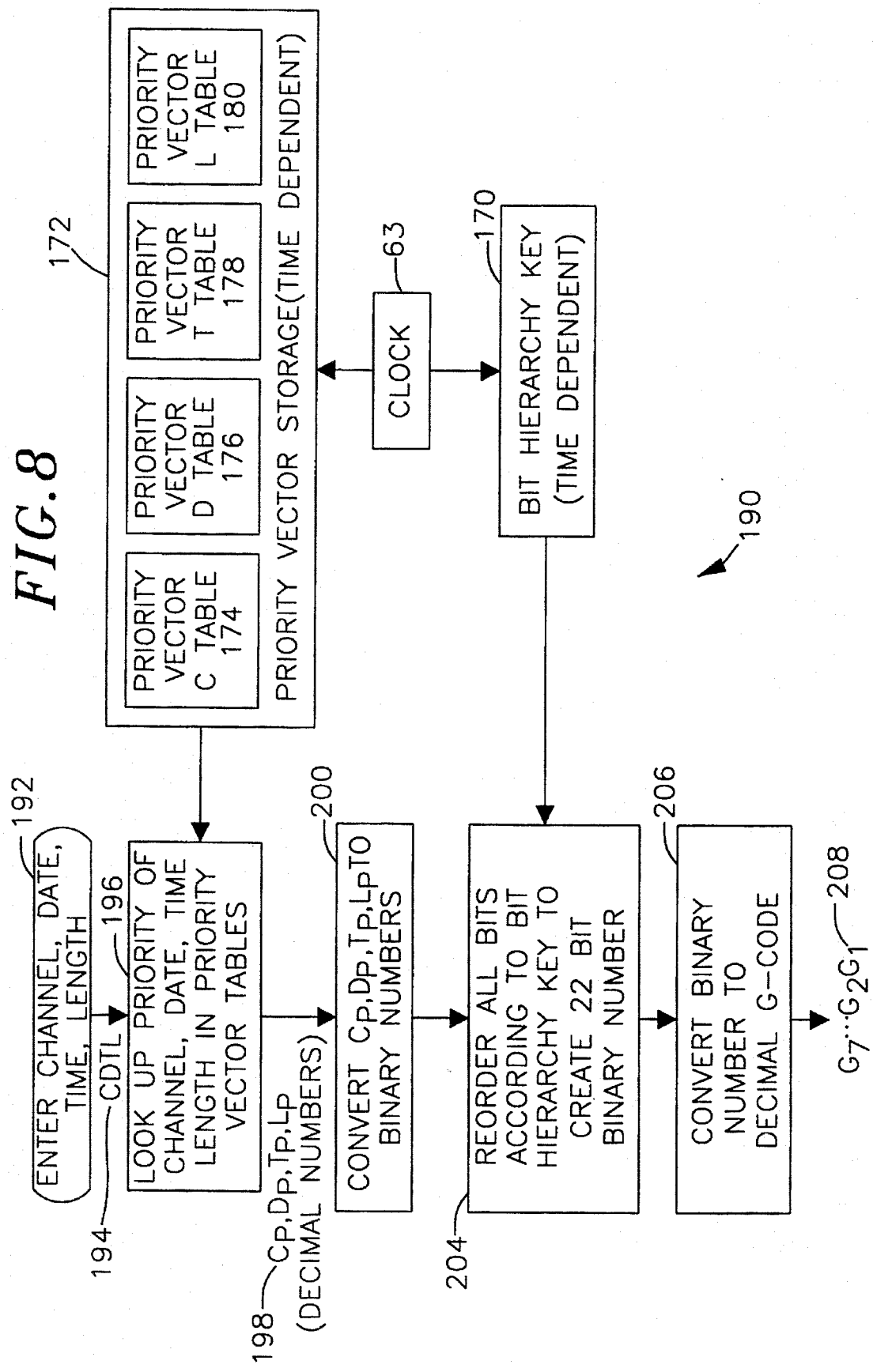

APPARATUS AND METHODS FOR USING COMPRESSED CODES FOR MONITORING TELEVISION PROGRAM VIEWING

CROSS-REFERENCE TO RELATED APPLICATIONS

This is a continuation-in-part of Ser. No. 08/000,934, filed Jan. 5, 1993, abandoned; which is a continuation-in-part of Ser. No. 07/965,075, filed Oct. 22, 1992, abandoned; which is a continuation of Ser. No. 07/877,687, filed May 1, 1992, abandoned; which is a continuation-in-part of Ser. No. 07/829,412, filed Feb. 3, 1992, U.S. Pat. No. 5,307,173; which is a continuation-in-part of Ser. No. 07/767,323, filed Sep. 30, 1991, abandoned; which is a continuation-in-part of Ser. No. 07/676,934, filed Mar. 27, 1991, U.S. Pat. No. 5,335,079; which is a continuation-in-part of Ser. No. 07/371,054 filed Jun. 26, 1989, abandoned; which was a continuation-in-part of Ser. No. 07/289,369, filed Dec. 23, 1988, abandoned. The above referenced applications are incorporated herein by reference.

BACKGROUND OF THE INVENTION

This invention relates to apparatus and methods for monitoring the audiences of television programs.

Advertising rates for commercials of television programs are determined by the expected size of the viewer audience. These expectations are usually determined by the estimated audience sizes of the previously broadcast shows. For example, a weekly television series will estimate its audience size for upcoming episodes based on the estimated viewers of previously broadcast shows. Advertising rates may be adjusted based on an "after the fact" estimation of the market share for the televised program. The present systems for estimating market share involve survey evidence such as the Neilson ratings. The Neilson ratings are determined by selected households which record their viewing habits. For example, a selected household might record in a written journal or diary when they turn on and off the television, what channels are selected and the number of viewers in the room. The viewership data may alternately be collected by providing the user with an electronic device which will record the time the television is on and the channel selected. In one implementation, the user is provided with a remote controller, or there is a button on the electronic device, that the user pushes when turning on and off the television. The channel tuner is monitored electronically to determine the channel selected.

Television in the United States is broadcast in a frame format with the odd number lines being scanned during the first field of a frame and the even number lines being scanned during the second field of a frame. Between fields it is necessary for the beam to move or fly back to the upper left corner or upper middle of the screen. During the fly back interval in which the beam returns to the top, the picture on the television is blank. This period of time is called a vertical blanking interval (VBI). The vertical blanking interval can be used to broadcast additional information. For example, close captioning for the deaf is broadcast during a portion of the vertical blanking interval.

The vertical blanking interval can be used to broadcast program information synchronous with the program being transmitted. For example, the title of the program, channel number and time of the broadcast can all be broadcast in the vertical blanking interval. Electronic devices are available for audience monitoring that can decode the vertical blanking interval and read the program information from the vertical blanking interval and store it in a memory. Then on command the memory can be dumped over a telephone line to a central computer for analysis. A shortcoming of this approach is that the program information requires an extensive amount of the vertical blanking interval. It is important to efficiently use the limited vertical blanking interval, because there are increasing demands to include other information in the vertical blanking interval, such as an electronic television guide.

Accordingly, there is a need in the art for an apparatus and method for using compressed codes for audience monitoring, which would consume significantly less of the vertical blanking interval than the combination of a channel number and a time of broadcast for a program. There is also the need in the art for reducing the amount of information which must be stored in an electronic device for audience monitoring and for reducing the amount of information that must be transmitted over telephone lines from the audience monitoring device to a central computer facility.

SUMMARY OF THE INVENTION

According to the present invention, methods and apparatus for television audience monitoring are provided.

In an embodiment of the present invention, an apparatus for television audience monitoring comprises means for determining that a television is turned on, means for retrieving compressed codes, each representative of, and compressed in length from, the combination of a channel and a time-of-day for a program from a television signal received by the television, means for decoding and expanding each compressed code into a channel and time-of-day for a program, and means for storing the channel and time-of-day for a program when the means for determining that a television set is turned on indicates that the television set is turned on.

In a specific embodiment, the apparatus further comprises a clock for providing an output as a function of time coupled to the means for decoding and expanding, and the means for decoding and expanding a compressed code into channel and time-of-day performs the decoding and expanding as a function of the clock output.

In another specific embodiment the means for decoding and expanding the compressed code into channel and time-of-day further comprises means for converting the compressed code into a binary number, means for reordering the bits in the binary number to obtain a reordered binary compressed code, means for grouping the reordered binary compressed code into channel and time-of-day priority numbers, and means for using the channel and time-of-day priority numbers to derive the channel and time-of-day.

In yet another specific embodiment the means for determining that a television is turned on further comprises an infrared detector for sensing when an infrared emitter on a remote controller sends a power on command to a television.

In another specific embodiment the apparatus for audience monitoring measures the time that a program is "on" by observing when a compressed code retrieved from the television signal changes.

In another specific embodiment the means for retrieving a compressed code from a television signal coupled to the television comprises a vertical blanking interval decoder.

In another specific embodiment the apparatus for audience monitoring further comprises means for sending over a telephone line the stored channel and time-of-day for a program when commanded.

In another specific embodiment the audience monitored further comprises means for sending the time a program is "on" over a telephone line.

In an alternate embodiment of the apparatus for audience monitoring, compressed codes, each representative of, and compressed in length from, the combination of a channel and a time-of-day for a program, are retrieved from a television signal received by the television and stored.

In a specific embodiment the apparatus for audience monitoring further comprises means for sending over a telephone line the stored compressed codes for a program when commanded.

In another embodiment, a method for television audience monitoring comprises the steps of determining that a television is turned on, retrieving compressed codes, each representative of, and compressed in length from, the combination of a channel and a time-of-day for a program from a television signal received by the television, decoding and expanding each compressed code into a channel and a time-of-day for a program, and storing the channel and time-of-day for a program when the television set is turned on.

In an alternate embodiment the method further comprises the steps of providing a clock having an output as a function of time, and performing the decoding and expanding of the compressed code into channel and time-of-day as a function of the clock output.

In yet another embodiment the step of decoding and expanding the compressed code into channel and time-of-day further comprises the steps of converting the compressed code into a binary number, reordering the bits in the binary number to obtain a reordered binary compressed code, grouping the reordered binary compressed code into channel and time-of-day priority numbers, and using the channel and time-of-day priority numbers to derive the channel and time-of-day.

In another specific embodiment the step of determining that a television is turned on further comprises the step of providing an infrared detector, and sensing when an infrared emitter on a remote controller sends a power on command to a television.

In another specific embodiment the step of storing further comprises the step of determining whether a compressed code is different from the last observed compressed code and if different then storing the compressed code.

In another specific embodiment, the method includes the step of measuring the duration that a program is "on" by observing when a compressed code read from the vertical blanking interval changes.

In yet another specific embodiment the method of audience monitoring further comprises the step of sending over a telephone line the stored channel and time-of-day for a program when commanded.

In another embodiment, a method for television audience monitoring comprises the steps of determining that a television is turned on, retrieving compressed codes, each representative of, and compressed in length from, the combination of a channel and a time-of-day, for a program from a television signal received by the television, and storing the compressed codes for a program when the television set is turned on.

In a specific embodiment the step of storing further comprises the step of determining whether a compressed code is different from the last observed compressed code and if different then storing the compressed code.

In yet another specific embodiment the method of audience monitoring further comprises the step of sending over a telephone line the stored compressed code for a program when commanded.

BRIEF DESCRIPTION OF THE DRAWINGS

The features of specific embodiments of the best mode contemplated of carrying out the invention are illustrated in the drawings, in which:

FIG. 8 is a flowchart showing the steps employed in encoding the compressed code in accordance with principles of the invention.

DETAILED DESCRIPTION OF THE SPECIFIC EMBODIMENTS

Figure 1A:
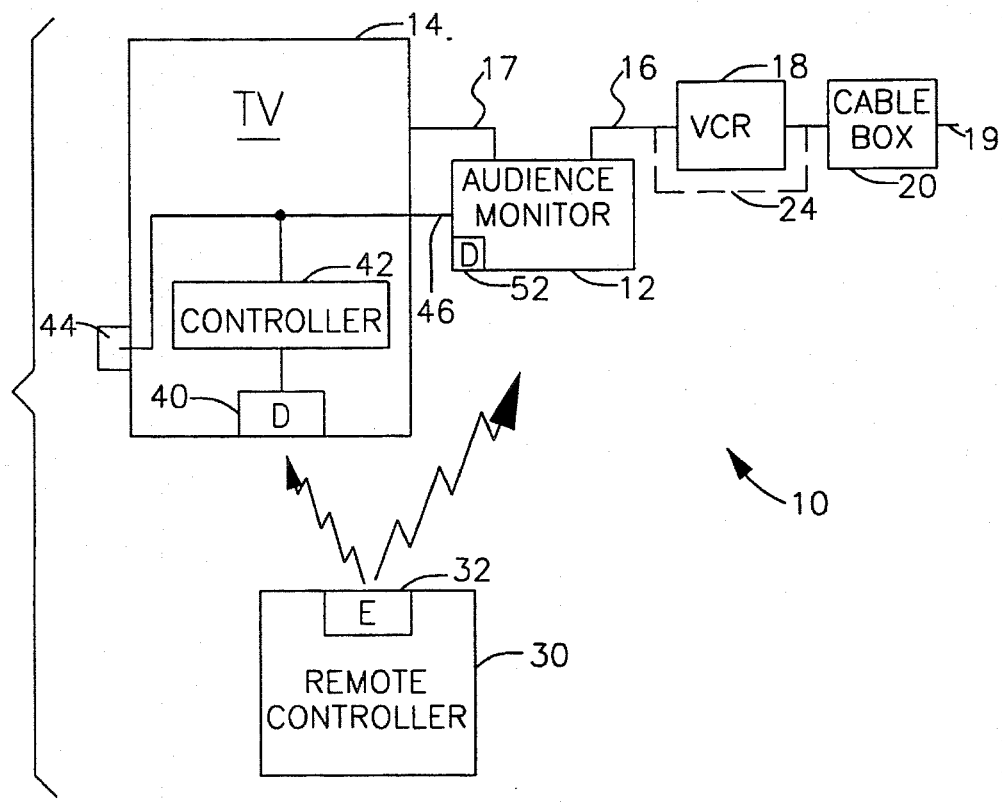
FIG. 1a is a block diagram illustrating an audience monitor used with a television and a cable box and with or without a VCR in accordance with principles of the invention.

FIG. 1a is a block diagram illustrating an audience monitor 12 used with a television 14 and a cable box 20 and with or without a video cassette recorder (VCR) 18 in accordance with principles of the invention. In FIG. 1a, the broadband television signal on line 19 is first received by the cable box 20, which is tuned to the desired channel. If a VCR 18 is present, then it is tuned to channel 3 or 4 and outputs television channel signal on line 16. Alternately, the VCR 18 can be bypassed by connecting the cable box 20 directly to line 16 via cable 24. The television channel signal on line 16 is sent to audience monitor 12. As will be described, the audience monitor 12 decodes the vertical blanking interval (VBI) lines and retrieves from the VBI a compressed code uniquely representing the combination of channel, date and time-of-day and length for a received program. The audience monitor 12 then can directly store the compressed code and transmit it upon command to a central computer facility or the audience monitor 12 can decode the compressed code into channel, date, time-of-day and length and store this information for later transmission to a central computer facility. The audience monitor output is sent via line 17 to the television (TV) 14, which is tuned to channel 3 or channel 4, respectively.

It is necessary for the audience monitor 12 to know when the television (TV) 14 is "on". In one embodiment a remote controller 30 has an infrared emitter 32 and is used to turn on and off the television. The audience monitor 12 is provided with a infrared detector 52 to sense the on and off status of the television. In addition or alternately, the manual on/off switch 44 for the television (TV) 14 can be directly connected to the audience monitor 12 via line 46. The television (TV) 14 can also have an infrared detector 40 coupled to the controller 42 in the television (TV) 14. The controller 42 in the television (TV) 14. The controller 42 is connected to the audience monitor 12 via line 46.

Figure 6:
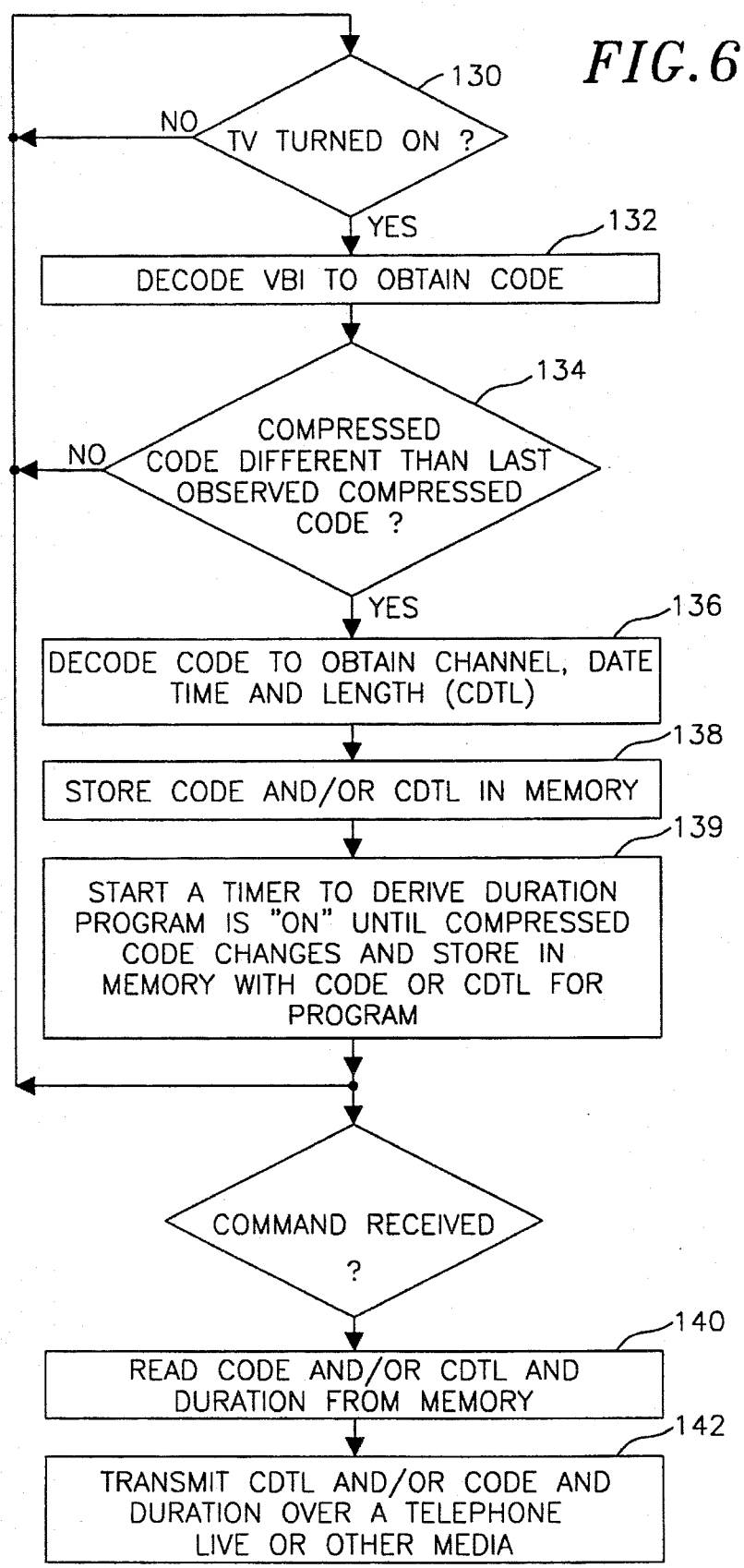
FIG. 6 is a flowchart showing the steps employed in television audience monitoring in accordance with principles of the invention.

The TV on/off signal is used by the audience monitor 12 to determine whether to decode the television signal vertical blanking interval line to obtain the compressed codes, as described in FIG. 6. If the TV is off then the audience monitor can be effectively in an off state.

Figure 1B:
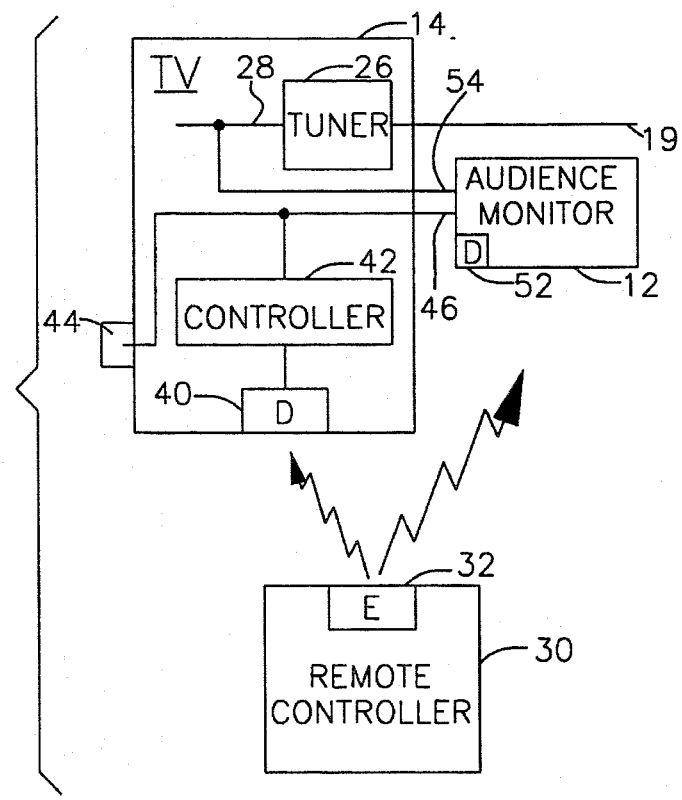
FIG. 1b is a block diagram illustrating an audience monitor used with a television in accordance with principles of the invention.

FIG. 1b is a block diagram illustrating an audience monitor 12 used directly with a television 14 in accordance with principles of the invention. In FIG. 1b, the broadband television signal on line 19 is connected directly to the television tuner 26 in the television (TV) 14. The tuned television channel signal on line 28 is then connected to the television and to the input 54 of the audience monitor 12, which performs the same functions as described for the audience monitor 12 in FIG. 1a. The audience monitor 12 in FIG. 1b again receives the TV on/off signal on line 46 from the television (TV) 14 or receives the on/off command from the remote controller 30 via the infrared detector 52.

Figure 2:
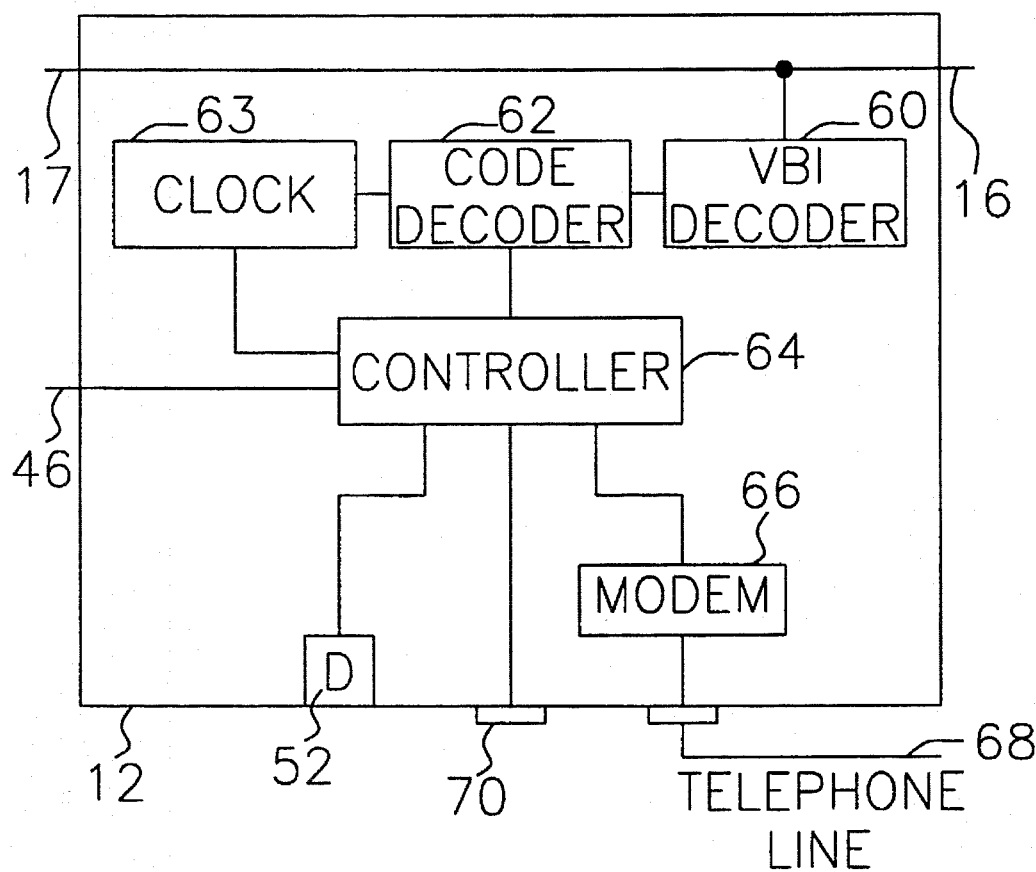
FIG. 2 is a detailed block diagram illustrating an audience monitor used with a television in accordance with principles of the invention.

FIG. 2 is a detailed block diagram illustrating an audience monitor 12 in accordance with principles of the invention. The audience monitor 12 includes: a VBI decoder 60 coupled to the television channel signal on line 16; a compressed code decoder 62 coupled to the VBI decoder 60; a clock 63 coupled to the code decoder 62; and a controller 64 coupled to the code decoder 62. Additionally, the audience monitor 12 can include a infrared detector 52 and a modem 66 coupled to a telephone line 68. The VBI decoder 60 decodes the television channel signal on line 16 and the code decoder 62 decodes the compressed codes contained in the VBI. The clock can be used by the code decoder 62 to perform the decoding. The controller 64 provides a programmable controller for performing the logic of the audience monitor 12, including handling the TV on/off signal on line 46, and receiving commands and sending responses via the modem 66. The controller 64 can also be used to interpret commands received from the infrared detector 52. A separate connector 70 can be provided for directly interfacing to the audience monitor 12.

Figure 3:
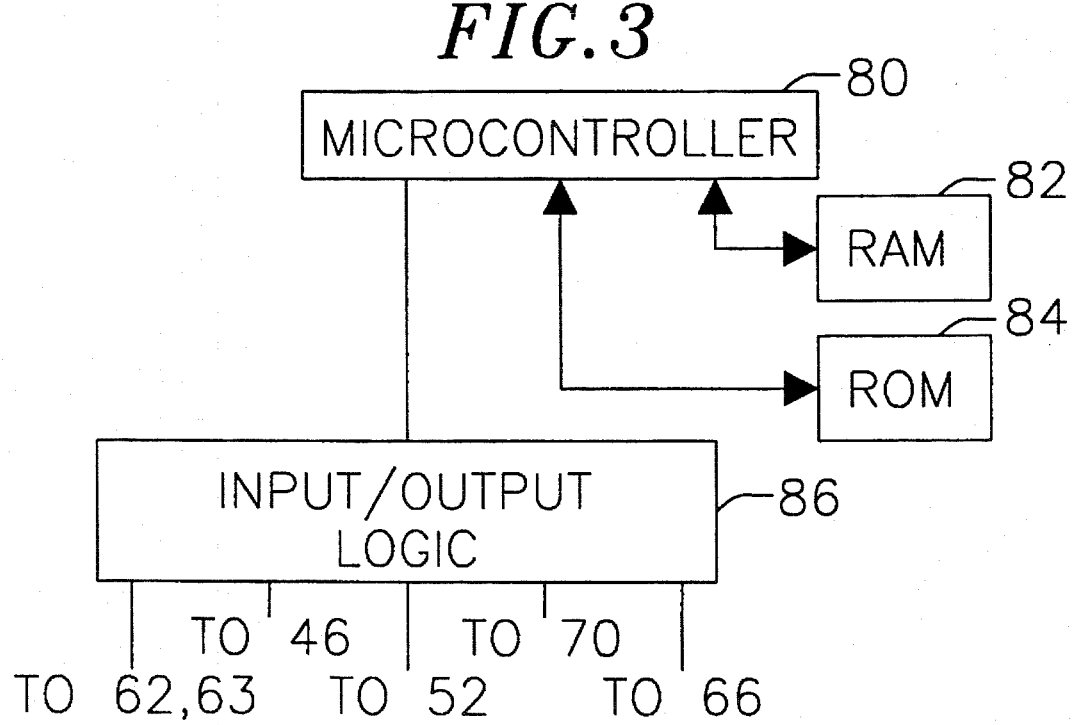
FIG. 3 is a schematic of a processor for implementing the controller of an audience monitor in accordance with principles of the invention.

FIG. 3 is a schematic of a processor for implementing the controller 64 of audience monitor 12. The controller 64 can be implemented with a microcontroller 80, which can include built in random access memory and read only memory. Alternately, external random access memory 82 and external ROM 84 can be provided. The input/output logic 86 would be used to interface between the microcontroller 80 and the interfaces of controller 64, as shown in FIG. 2.

Figure 4:
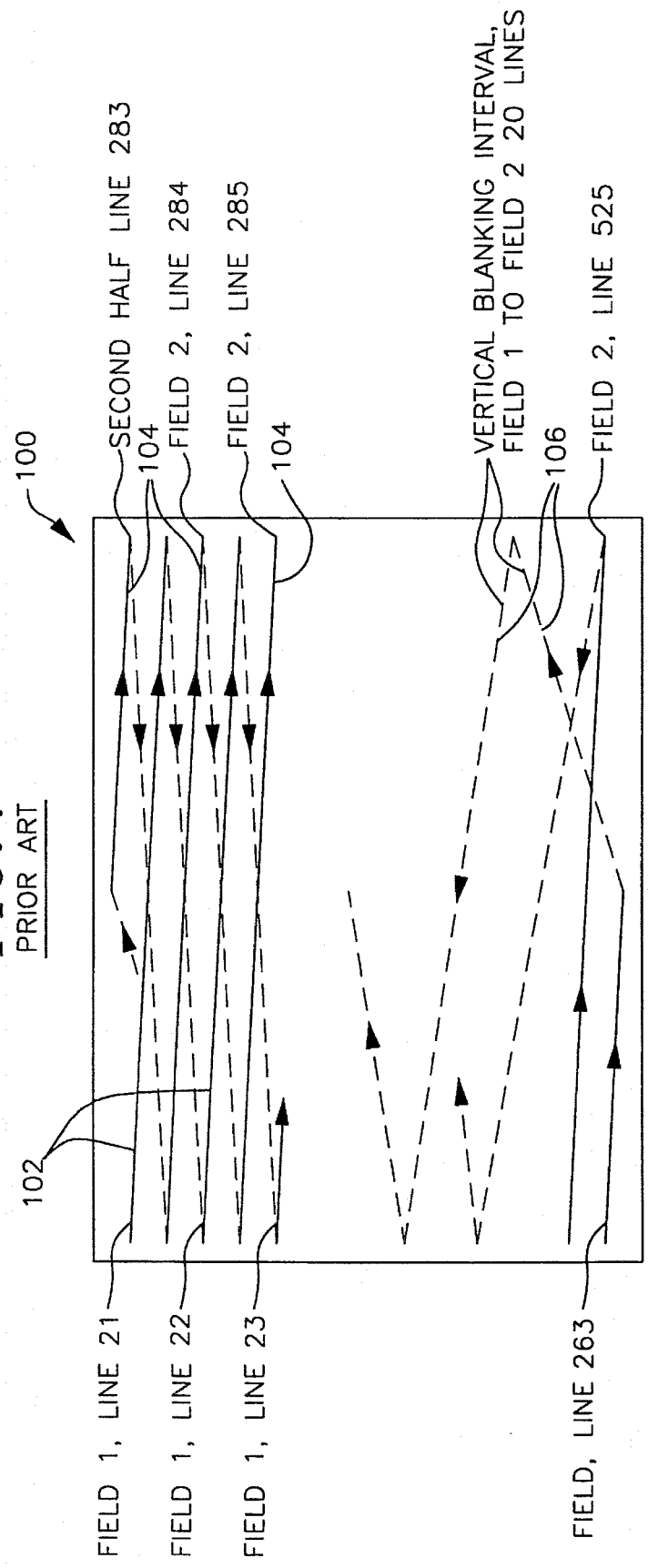
FIG. 4 is a diagram illustrating the fields, frames and vertical blanking interval of an interlaced television scanning raster.

FIG. 4 is a diagram illustrating the fields, frames and vertical blanking interval of an interlaced television scanning raster 100. There are at least 20 lines in the vertical blanking interval of each field. The first field 102 of the television signal has 20 vertical blanking internal lines and then starts at the upper left corner of the screen and writes lines 21, 22, . . . 263. At the bottom of the screen the beam writing the screen retraces in a series of lines 106 back to the top of the screen, as shown in FIG. 4. This is the vertical blanking interval. During the retrace the writing to the screen is blanked; however, because the television carrier signal is still present, additional information can be sent during the vertical blanking interval. After the vertical blanking interval, the second field 104 is written on the screen and lines 283, 284, . . . 525 are interleaved between the lines of the first field 102. The two fields and the vertical blanking interval together constitute a frame. It is during a vertical blanking interval that a compressed code can be transmitted and received by audience monitor 12.

Figure 5:
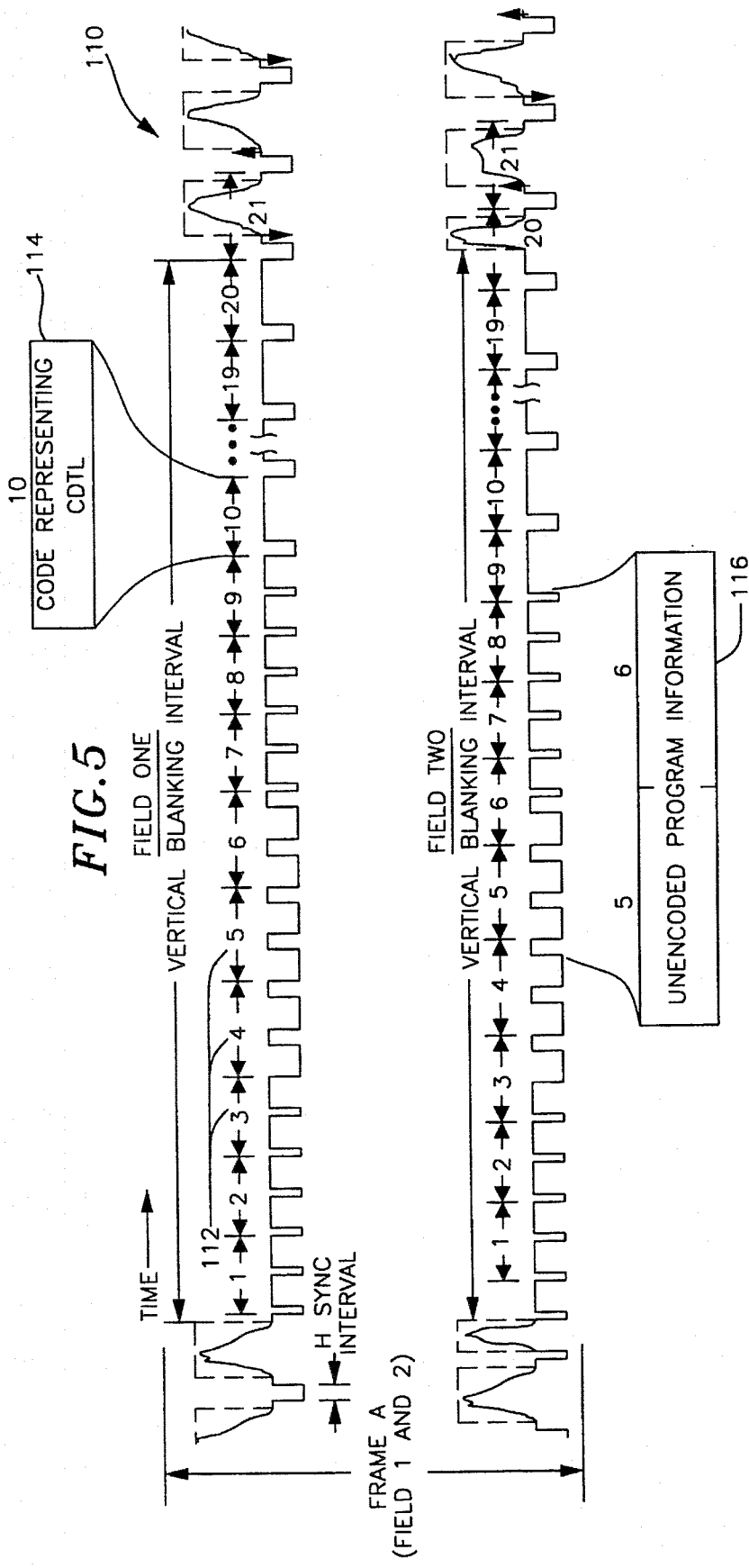
FIG. 5 is a diagram illustrating the timing of the vertical blanking interval lines of an interlaced television scanning raster.

FIG. 5 is a diagram illustrating the timing 110 of the conventional vertical blanking interval lines 1 to 20 of field 1 and VBI lines 263 to 283 of field 2. As shown each vertical blanking interval line 112 occupies a portion of the time span. In the conventional art, unencoded program information 116, including the channel number, date and time and length of broadcast and possibly the program title, is included in at least two of the vertical blanking interval lines. A compressed code 114, representative of, and compressed in length from, the combination of a channel, a date, a time-of-day, and a length for a program, is able to fit into only a single vertical blanking interval line. This provides an advantage over the conventional art, because fewer vertical blanking interval lines 112 are used.

FIG. 6 is a flowchart showing the steps employed in a method for television audience monitoring in accordance with principles of the invention. In step 130, a test is made to determine whether a television is turned on. If not then step 130 is repeated, otherwise in step 132 the VBI is decoded and a compressed code representative of, and compressed in length from, the combination of a channel, a date, a time-of-day, and a length for a program is extracted from the VBI. In step 134, a test is made to determine whether the extracted compressed code is different from the last observed compressed code. If not then step 130 is repeated. If the compressed code is different then the compressed code is decoded in step 136 to obtain a channel, a date, a time-of-day, and a length for a program being received by the television. In step 138 the compressed code or the decoded channel, date, time-of-day, and length for a program are stored in memory, such as the random access memory 82 shown in FIG. 3. In step 139, a timer is started to derive the duration a program is "on." The timer can be implemented with clock 63 and controller 64. The length of the program and the duration a program is "on" can be used together to detect how long the viewer watches a program and also how often channels are switched. The duration a program is "on" is stored in memory along with the compressed code or repeatedly executed. The purpose is to record program information in the memory for each program being received by the television when the television is on.

When a command is received either over a telephone line 68 or through connector 70, the compressed code or the decoded channel, date, time-of-day, and length for a program are read from memory in step 140, and transmitted over a telephone line 68 or other media in step 142. Also, the time the program is "on" can be read from memory and sent over the media.

Figure 7:
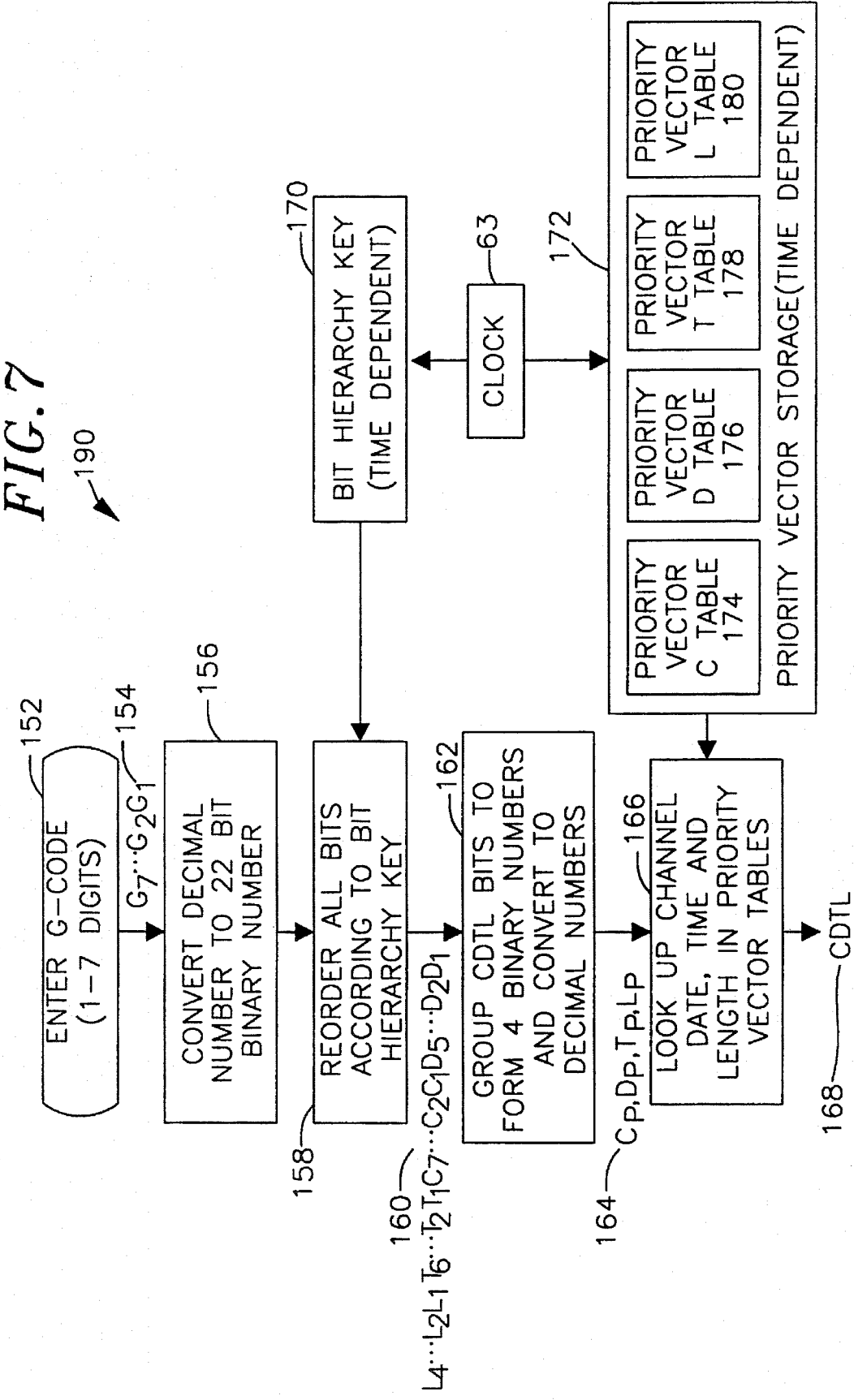
FIG. 7 is a flowchart showing the steps employed in decoding the compressed code in accordance with principles of the invention.

FIG. 7 is a flow diagram of a preferred compressed code decoding technique which is similar to the VCR compressed codes described in PCT application WO 90/07844 to Yuen, et al. There are further compressed code techniques in WO 90/07844, which are incorporated herein by reference. To understand compressed code decoding, it is easiest to first explain the compressed code encoding technique, for which FIG. 8 is the flow chart. Then the compressed code decoding technique, which is the reverse of the compressed code encoding will be explained.

The encoding of the compressed codes can be done on any computer and is done prior to the inclusion of the compressed codes in the vertical blanking interval. For each program, a channel, date, time and length (CDTL) 194 is entered in step 192. Step 196 separately reads the priority for the channel, date, time and length in the priority vector storage 172, which can be stored in a memory. The priority vector storage 172 contains four tables: a priority vector C table 174, a priority vector D table 176, a priority vector T table 178 and a priority vector L table 180.

The channel (C) priority table 174 is ordered so that the most frequently used channels have a low priority number. An example of the data that is in priority vector C table 174 follows.

| channel | 4 | 7 | 2 | 3 | 5 | 6 | 11 | 13 | ... |
|---|---|---|---|---|---|---|---|---|---|
| channel | 4 | 7 | 2 | 3 | 5 | 6 | 11 | 13 | ... |
| priority | 0 | 1 | 2 | 3 | 4 | 5 | 6 | 7 | ... |

Generally the dates of a month all have an equal priority, so the low number days in a month and the low number priorities would correspond in the priority vector D table 176 as in the following example.

| date | 1 | 2 | 3 | 4 | 5 | 6 | 7 | 8 | 9 | 10 | ... |
|---|---|---|---|---|---|---|---|---|---|---|---|
| priority | 0 | 1 | 2 | 3 | 4 | 5 | 6 | 7 | 8 | 9 | ... |

The priority of the start times would be arranged so that prime time would have a low priority number and programs in the dead of the night would have a high priority number. For example, the priority vector T table 178 would contain:

| time | 6:30 pm | 7:00 pm | 8:00 pm | 7:30 pm | ... |
|---|---|---|---|---|---|
| priority | 0 | 1 | 2 | 3 | ... |

An example of the data that is in the priority vector L table 180 is the following:

| length of program (hrs) | 0.5 | 1.0 | 2.0 | 1.5 | 3.0 | ... |
|---|---|---|---|---|---|---|
| priority | 0 | 1 | 2 | 3 | 4 | ... |

Suppose the channel, date, time, and length (CDTL) 94 data is 5 10 19.00 1.5, which means channel 5, 10th day of the month, 7:00 PM, and 1.5 hours in length, then for the above example the $C_p, D_p, T_p, L_p$ data 198, which are the result of looking up the priorities for channel, date, time and length in priority tables 174, 176, 178 and 180 of FIG. 8, would be 4 9 1 3. Step 200 converts $C_p, D_p, T_p, L_p$ data to binary numbers. The number of binary bits in each conversion is determined by the number of combinations involved. Seven bits for $C_p$, which can be denoted as $C_7 C_6 C_5 C_4 C_3 C_2 C_1$, would provide for 128 channels. Five bits for $D_p$, which can be denoted as $D_5 D_4 D_3 D_2 D_1$, would provide for 31 days in a month. Six bits for $T_p$, which can be denoted as $T_6 T_5 T_4 T_3 T_2 T_1$, would provide for 48 start times on each half hour of a twenty four hour day. Four bits for length, which can be denoted as $L_4 L_3 L_2 L_1$, would provide for a program length of up to 8 hours in half hour steps. Together there are 7+5+6+4=22 bits of information, which correspond to 2**22=4,194,304 combinations.

The next step is to use bit hierarchy key 170, to reorder the 22 bits. The bit hierarchy key 170 can be any ordering of the 22 bits. For example, the bit hierarchy key might be:

| $L_8$ | $C_3$ | ... | $T_2$ | $C_2$ | $T_1$ | $C_1$ | $L_1$ | $D_5$ | $D_4$ | $D_3$ | $D_2$ | $D_1$ |
|---|---|---|---|---|---|---|---|---|---|---|---|---|
| 22 | 21 | ... | 10 | 9 | 8 | 7 | 6 | 5 | 4 | 3 | 2 | 1 |

Ideally the bit hierarchy key is ordered so that programs most likely to be the subject of timer preprogramming would have a low value binary number, which would eliminate keystrokes for timer preprogramming the most popular programs. Since all the date information has equal priority, then the $D_5 D_4 D_3 D_2 D_1$ bits are first. Next $T_1 C_1 L_1$ are used, because for whatever date it is necessary to have a time channel and length and $T_1 C_1 L_1$ are the most probable in each case due to the ordering of the priority vectors in priority vector storage 172. The next bit in the hierarchy key is determined by the differential probabilities of the various combinations. One must know the probabilities of all the channels, times and lengths for this calculation to be performed.

For example, the probability for channels may be:

| channel | 4 | 7 | 2 | 3 | 5 | 6 | 11 | 13 | ... |
|---|---|---|---|---|---|---|---|---|---|
| priority | 0 | 1 | 2 | 3 | 4 | 5 | 6 | 7 | ... |
| probability (%) | 5 | 4.3 | 4 | 3 | 2.9 | 2.1 | 2 | 1.8 | ... |

The probabilities for times might be:

| time | 6:30 pm | 7:00 pm | 8:00 pm | 7:30 pm | ... |
|---|---|---|---|---|---|
| priority | 0 | 1 | 2 | 3 | ... |
| probability (%) | 8 | 7.8 | 6 | 5 | ... |

And, the probabilities for lengths might be:

| length of program (hours) | 0.5 | 1.0 | 2.0 | 1.5 | 3.0 | ... |
|---|---|---|---|---|---|---|
| priority | 0 | 1 | 2 | 3 | 4 | ... |
| probability (%) | 50 | 20 | 15 | 5 | 4 | ... |

The probabilities associated with each channel, time and length, as illustrated above, are used to determine the proper ordering. Since the priority vector tables are already ordered by the most popular channel, time, and length, the order in which to select between the various binary bits for one table, for example selecting between the $C_7 C_6 C_5 C_4 C_3 C_2 C_1$ bits, is already known. The $C_1$ bit would be selected first because as the lowest order binary bit it would select between the first two entries in the channel priority table. Then the $C_2$ bit would be selected and so on. Similarly, the $T_1$ and $L_1$ bits would be used before any of the other time and length bits. A combination of the $C_1, T_1, L_1$ and $D_5 D_4 D_3 D_2 D_1$ bits should be used first, so that all the information is available for a channel, date, time and length. The $D_5 D_4 D_3 D_2 D_1$ bits are all used because the date bits all have equal priority and all are needed to specify a date even if some of the bits are binary zero.

At this point the bit hierarchy key could be:

$T_1 C_1 L_1 D_5 D_4 D_3 D_2 D_1$

The first channel binary bit $C_1$ by itself can only select between $2^1=2$ channels, and the first two channels have a probability percent of 5 and 4.3, respectively. So the differential probability of $C_1$ is 9.3. Similarly, the differential probability of $T_1$ is 8+7.8=15.8, and the differential probability of $L_1$ is 50+20=70. If the rules for ordering the bit hierarchy key are strictly followed, then the first 8 bits of the bit hierarchy key should be ordered as:

$C_1\ T_1\ L_1\ D_5\ D_4\ D_3\ D_2\ D_1,$ because $L_1$ has the highest differential priority so it should be next most significant bit after $D_5$, followed by $T_1$ as the next most significant bit, and then $C_1$ as the next most significant bit. Notice that the bit hierarchy key starts with the least significant bit $D_1$, and then is filled in with the highest differential probability bits. This is for the purpose of constructing the most compact codes for popular programs.

The question at this point in the encoding process is what should the next most significant bit in the hierarchy key be: $T_2$, $C_2$, or $L_2$. This is again determined by the differential probabilities, which can be calculated from the above tables for each bit. Since we are dealing with binary bits, the $C_2$ in combination with $C_1$ selects between $2^2=4$ channels or 2 more channels over $C_1$ alone. The differential probability for $C_2$ is then the additional probabilities of these two additional channels and for the example this is: 4+3=7. In a similar manner $C_3$ in combination with $C_1$ and $C_2$ selects between $2^3=8$ channels or $4=2^{(3-1)}$ more channels over the combination of $C_1$ and $C_2$. So the differential probability of $C_3$ is the additional probabilities of these four additional channels and for the example this is: 2.9+2.1+2+1.8=8.8. In a similar manner, the differential probabilities of $T_2$ and $L_2$ can be calculated to be 6+5=11 and 15+5=20, respectively. Once all the differential probabilities are calculated, the next step is determining which combinations of bits are more probable.

Now for the above example, which combination is more probable: $T_2$ with $C_1\ L_1$, or $C_2$ with $T_1\ L_1$, or $L_2$ with $T_1\ C_1$. This will determine the next bit in the key. So, which is greater: 11×9.3×70=7161; 7×15.8×70=7742; or 20×15.8× 9.3=2938.8? In this case the combination with the greatest probability is 7×15.8×70=7742, which corresponds to $C_2$ with $T_1\ L_1$. So, $C_2$ is selected as the next bit in the bit hierarchy key. The next bit is selected in the same way. Which combination is more probable: $C_3$ with $T_1\ L_1$, or $T_2$ with $C_1$ or $C_2$ and $L_1$, or $L_2$ with $C_1$ or $C_2$ and $T_1$. For the example shown, which has the greatest probability: 8.8× 15.8×70=9732.8; 11×(9.3+7)×70=12551; or 20×(9.3+7)×15.8=5150.87 In this case the combination with the greatest probability is 11×(9.3+7)×70=12551, which corresponds $T_2$ with $C_1$ or $C_2$ and $L_1$. So, $T_2$ is selected as the next bit in the bit hierarchy key. This procedure is repeated for all the differential probabilities until the entire key is found.

Alternately, the bit hierarchy key can be just some arbitrary sequence of the bits. It is also possible to make the priority vectors interdependent, such as making the length priority vector dependent on different groups of channels. Another technique is to make the bit hierarchy key 170 and the priority vector tables 172, a function of clock 63, as shown in FIG. 8. This makes it very difficult for the key and therefore the coding technique to be duplicated or copied.

For example it is possible to scramble the date bits in the bit hierarchy key 170 as a function of the clock. Changing the order of the bits as a function of the clock would not change the effectiveness of the bit hierarchy key in reducing the number of binary bits for the most popular programs, because the date bits all are of equal priority. This could be as simple as switching the $D_1$ and $D_5$ bits periodically, such as every day or week. Thus the bit hierarchy key 170 would switch between

| ... | $C_1$ | $T_1$ | $L_1$ | $D_5$ | $D_4$ | $D_3$ | $D_2$ | $D_1$ | and |
| --- | --- | --- | --- | --- | --- | --- | --- | --- | --- |
| ... | $C_1$ | $T_1$ | $L_1$ | $D_1$ | $D_4$ | $D_3$ | $D_2$ | $D_5$. | |

Clearly other permutations of the bit hierarchy key as a function of the clock are possible.

The priority vector tables could also be scrambled as a function of the clock. For example, the first two channels in the priority channel table could just be swapped periodically. If this technique is followed, then the $C_p$ of 198 in FIG. 8 would change as a function of the clock 63. For example,

| channel | 4 | 7 | 2 | 3 | 5 | 6 | 11 | ... |
| --- | --- | --- | --- | --- | --- | --- | --- | --- |
| priority | 0 | 1 | 2 | 3 | 4 | 5 | 6 | 7 ... | would change periodically to:

| channel | 7 | 4 | 2 | 3 | 5 | 6 | 11 | ... |
| --- | --- | --- | --- | --- | --- | --- | --- | --- |
| priority | 0 | 1 | 2 | 3 | 4 | 5 | 6 | 7 ... |

This would be a fairly subtle security technique, because a decoder that was otherwise correct would only fail if those first two channels were being used. Other clock dependencies are also possible to provide security for the coding technique.

However it is derived, the bit hierarchy key 170 is determined and stored. In step 204 the binary bits of $C_p,D_p,T_p,L_p$ are rearranged according to the bit hierarchy key 170 to create one 22 bit binary number. Then the resulting 22 bit binary number is converted to decimal in the convert binary number to decimal compressed code step 206. The result is compressed code 208.

If the priority vector and the bit hierarchy key are well matched to the viewing habits of the general population, then it is expected that the more popular programs would require no more than 3 or 4 digits for the compressed code.

Now that the encoding technique has been explained the decoding technique is just reversing the coding technique. This is done according to the flow chart of FIG. 7. This is the preferred compressed code decoding that can be built into compressed code decoder 62 in FIG. 2.

The first step 152 is to enter compressed code 154. Next the compressed code 154 is converted to a 22 bit binary number in step 156. Then the bits are reordered in step 158 according to the bit hierarchy key 170 to obtain the reordered bits 160. Then the bits are grouped together and converted to decimal form in step 162. As this point we obtain $C_p,D_p,T_p,L_p$ data 164, which are the indices to the priority vector tables. For the above example, we would have at this step the vector 4 9 13. This $C_p,D_p,T_p,L_p$ data 164 is then used in step 166 to look up channel, date, time, and length in priority vector storage 172. The CDTL 168 for the example above is 5 10 19.00 1.5, which means channel 5, 10th day of the month, 7:00 PM, and 1.5 hours in length.

If the coding technique is a function of the clock then it is also necessary to make the decoding technique a function of the clock. It is possible to make the bit hierarchy key 170 and the priority vector tables 172, a function of clock 63, as shown in FIG. 7. This again makes it very difficult for the key and therefore the coding technique to be duplicated or copied. It is also possible to have the decoding and encoding techniques dependent on any other predetermined or preprogrammable algorithm.

Although the above compressed code encoding and decoding technique is a preferred embodiment, it should be understood that there are many ways to encode and decode a compressed code and the scope of the invention is not to be restricted to the coding method described herein.

Thus, there has been described apparatus and methods for using compressed codes for audience monitoring, which consume significantly less of the vertical blanking interval than the combination of a channel, a date, a time-of-day, and a length for a program. There has also been described apparatus and methods for reducing the amount of information which must be stored in an electronic device for audience monitoring and for reducing the amount of information that must be transmitted over telephone lines from an audience monitoring device to a central computer facility.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

For example, instead of embedding the compressed codes in the vertical blanking interval lines of the television signal, the compressed codes can be placed anywhere in the television signal. For example, the compressed codes can be placed in the audio signal or be placed within the lines that are put onto the screen, such as line 22 of FIG. 4. If the compressed code is time shared with the actual video on line 22 and if the compressed code is put on line 22 only on every fourth frame, for example, then the viewer would see only the actual video.

It is also possible to have compressed codes that only encode the channel and the time-of-day information for a program because that is sufficient if the audience monitor is accessed daily.

It is therefore intended by the appended claims to cover any and all such applications, modifications and embodiments within the scope of the present invention.

What is claimed is:

1. An apparatus for television audience monitoring comprising:

means for sensing that a television is on;

means for retrieving compressed codes from a received television signal, each compressed code having at least one digit, each compressed code representative of, and compressed in length from, the combination of channel, time-of-day, and date for a program, and each compressed code embedded in the received television signal containing the program;

means for determining a time duration that a first program is displayed by the television by measuring the time duration between a time of first retrieving a first compressed code representing the first program from the television signal and a time of first retrieving a second compressed code representing a second program from the television signal, if the means for sensing senses that the television is on, each compressed code having at least one digit and each compressed code representative of, and compressed in length from, the combination of channel, time-of-day, and date for a program;

means for decoding and expanding the retrieved compressed code for the first program into a channel, time-of-day, and date for the first program; and means for storing the decoded channel, time-of-day, and date for the first program and for storing the measured time duration that the first program is displayed by the television.

2. The apparatus of claim 1, further comprising:

a clock for providing an output as a function of time coupled to the means for decoding and expanding; and wherein the means for decoding and expanding comprises a means for performing the decoding and expanding as a function of the clock output.

3. The apparatus of claim 2 wherein the means for decoding and expanding compressed codes comprises:

means for converting the compressed code into a binary number;

means for reordering the bits in the binary number to obtain a reordered binary compressed code;

means for grouping the reordered binary compressed code into channel and time-of-day priority numbers; and means for using the channel and time-of-day priority numbers to derive the channel and time-of-day.

4. The apparatus of claim 1 wherein the means for sensing that a television is on comprises a means for sensing when a remote controller sends a power on command to the television.

5. The apparatus of claim 1 wherein the means for retrieving compressed codes from the received television signal comprises a vertical blanking interval decoder.

6. The apparatus of claim 1 further comprising means for sending the stored channel, time-of-day, and date for the first program and the stored measured time duration that the first program is displayed by the television to a central station via telephone.

7. An apparatus for television audience monitoring comprising:

means for sensing that a television is on;

means for retrieving compressed codes from a received television signal, each compressed code having at least one digit, each compressed code representative of, and compressed in length from, the combination of channel, time-of-day, and date for a program, and each compressed code embedded in the received television signal containing the program;

means for determining a time duration that a first program is displayed by the television by measuring the time duration between a time of first retrieving a first compressed code representing the first program from the television signal and a time of first retrieving a second compressed code representing a second program from the television signal, if the means for sensing senses that the television is on, each compressed code having at least one digit and each compressed code representative of, and compressed in length from, the combination of channel, time-of-day, and date for a program; and means for storing the first compressed code, and for storing the measured time duration that the first program is displayed by the television.

8. The apparatus of claim 7 wherein the means for sensing that a television is on comprises a means for sensing when a remote controller sends a power on command to the television.

9. The apparatus of claim 7 wherein the means for retrieving compressed codes from the received television signal comprises a vertical blanking interval decoder.

10. The apparatus of claim 7 further comprising means for sending the stored compressed code for the first program and the stored measured time duration that the first program is displayed by the television to a central station via telephone.

11. A method for television audience monitoring comprising the steps of:

sensing that a television is on;

retrieving compressed codes from a received television signal, each compressed code having at least one digit, each compressed code representative of, and compressed in length from, the combination of channel, time-of-day, and date for a program, and each compressed code embedded in the received television signal containing the program;

determining a time duration that a first program is displayed by the television by measuring the time duration between a time of first retrieving a first compressed code representing the first program from the television signal and a time of first retrieving a second compressed code representing a second program from the television signal, if the step of sensing senses that the television is on, each compressed code having at least one digit and each compressed code representative of, and compressed in length from, the combination of channel, time-of-day, and date for a program;

decoding and expanding the retrieved compressed code for the first program into a channel, time-of-day, and date for the first program; and storing the decoded channel, time-of-day, and date for the first program and storing the measured time duration that the first program is displayed by the television.

12. The method of claim 11, further comprising the step of performing the decoding and expanding as a function of a clock input.

13. The method of claim 12 wherein the step of decoding and expanding compressed codes comprises the steps of:

converting the compressed code into a binary number;

reordering the bits in the binary number to obtain a reordered binary compressed code;

grouping the reordered binary compressed code into channel and time-of-day priority number; and using the channel and time-of-day priority numbers to derive the channel and time-of-day.

14. The method of claim 11 wherein the step of sensing that a television is on comprises the step of sensing when a remote controller sends a power on command to the television.

15. The method of claim 11 wherein the step of retrieving compressed codes from the received television signal comprises the step of retrieving data from a vertical blanking interval.

16. The method of claim 11 further comprising the step of sending the stored channel, time-of-day, and date for the first program and the stored measured time duration that the first program is displayed by the television to a central station via telephone.

17. A method for television audience monitoring comprising the steps of:

sensing that a television is on;

retrieving compressed codes from a received television signal, each compressed code having at least one digit, each compressed code presentative of, and compressed in length from, the combination of channel, time-of-day, and date for a program, and each compressed code embedded in the received television signal containing the program;

determining a time duration that a first program is displayed by the television by measuring the time duration between a time of first retrieving a first compressed code representing the first program from the television signal and a time of first retrieving a second compressed code presenting a second program from the television signal, if the step of sensing senses that the television is on, each compressed code having at least one digit and each compressed code representative of, and compressed in length from, the combination of channel, time-of-day, and date for a program; and storing the first compressed code and storing the measured time duration that the first program is displayed by the television.

18. The method of claim 17 wherein the step of sensing that a television is on comprises the step of sensing when a remote controller sends a power on command to the television.

19. The method of claim 17 where in the step of retrieving compressed codes from the received television signal comprises the step of decoding a vertical blanking interval.

20. The method of claim 17 further comprising the step of sending the stored compressed code for the first program and the stored measured time duration that the first program is displayed by the television to a central station via telephone.

* * * * *